Figure 1:
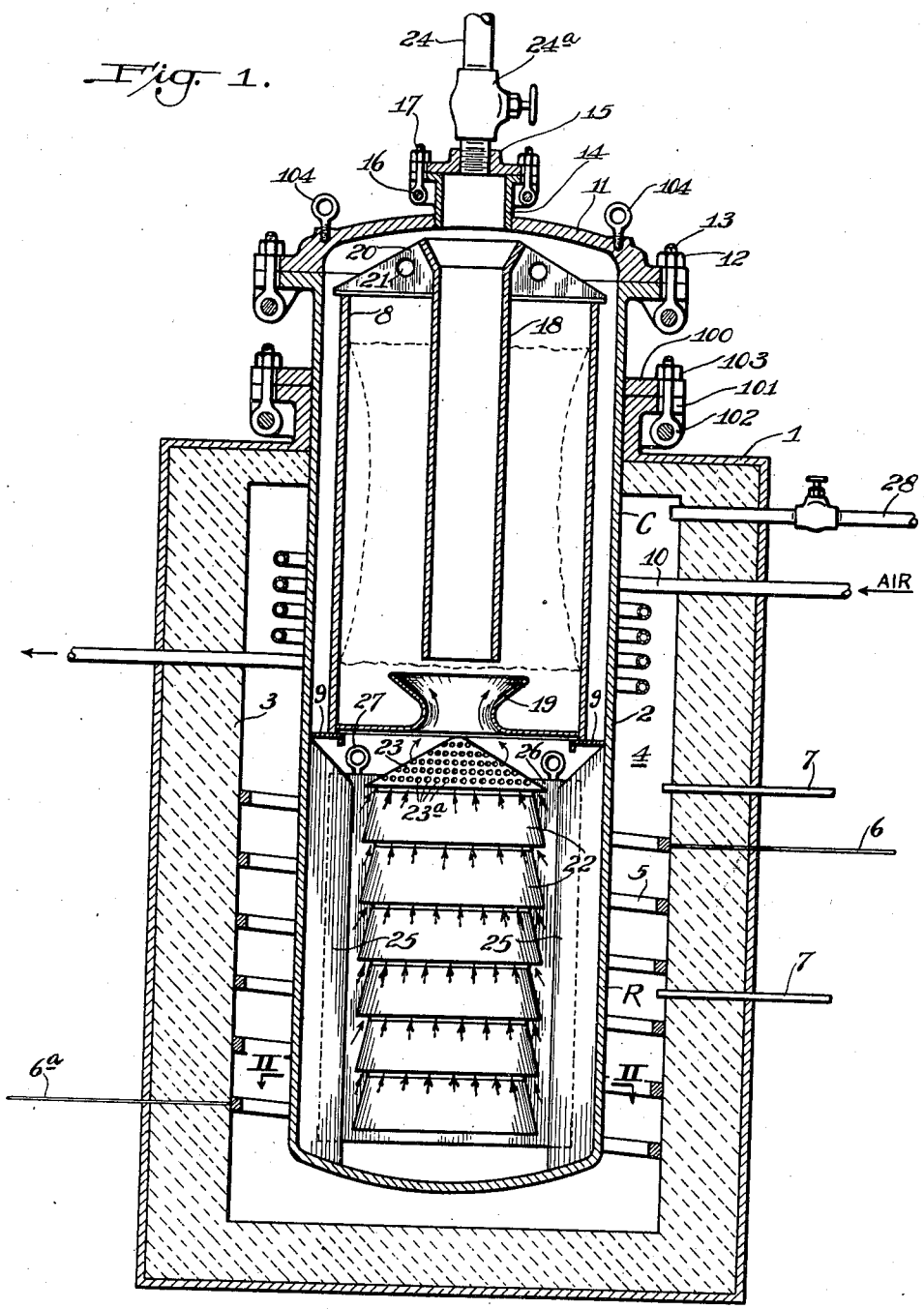

Feb. 2, 1943.    F. J. HANSGIRG    2,310,188
SUBLIMATION REFINING
Filed Sept. 22, 1941    2 Sheets-Sheet 1

INVENTOR.
Fritz J. Hansgirg
BY Brown, Jackson, Boettcher, Dienner
his ATTORNEYS.

Patented Feb. 2, 1943

2,310,188

UNITED STATES PATENT OFFICE 2,310,188

SUBLIMATION REFINING

Fritz J. Hansgirg, San Mateo, Calif., assignor, by mesne assignments, to The Anglo California National Bank of San Francisco, San Francisco, Calif., a national banking association, as trustee Application September 22, 1941, Serial No. 411,784
In Japan December 24, 1938

3 Claims. (Cl. 75—67)

This invention relates to the extracting of sublimable material from starting products containing such material in conjunction with non-sublimable body, and more particularly to the extracting of magnesium, by sublimation, from such starting material. This application is a continuation in part of my copending application Ser. No. 387,643 filed April 9, 1941.

The purification of high-boiling volatile substances, such as for instance metallic magnesium, by distillation under reduced pressure, encounters the difficulty that materials for the constructing of equipment sufficiently resistant to very high temperatures are hardly to be found. The attempts have, therefore, been directed to lower the distillation temperature by more and more reducing the absolute pressure in the system. These endeavors finally resulted, as a matter of course, in falling below the pressure at which the boiling point coincides with the melting point of the substance under treatment, and thus in substituting a sublimation process for the distillation process. In doing so not only the purpose of protecting the apparatus from rapid deterioration was accomplished, but also a purer product obtained.

In the special case of magnesium, the vapor pressure of the metal at its melting point is less than 2 mm., and as a consequence sublimation is too slow for practical purposes except at very low pressures. This is, however, attended with the drawback that the rush of vapor from the retort to the condenser entrains a substantial amount of non-volatile impurities heavily contaminating the resulting condensate. Particularly, this inconvenience occurs in the course of the reduction of magnesium oxide with the aid of carbon according to my Patent No. 1,884,993, granted October 25, 1932, in the first stage of which, on shock-chilling, the mixture of magnesium vapor and carbon monoxide disengaged, there is obtained a dusty condensate in an extremely fine division, from which metallic magnesium has to be recovered, in a second stage of operation, by distillation or sublimation. This intermediate product includes not only impurities coming from the ore started with, but—owing to partial reversion of the reduction reaction MgO+C=Mg+CO being by no means completely avoidable—also considerable amounts of magnesium oxide and carbon. If in this second stage it is attempted to refine the extremely finely divided dusty condensate of the first stage by a sublimation operation in which commercially economical rates of vapor flow are obtained, the vapor evolved will carry over not only non-sublimable impurities but also virgin magnesium dust in itself, even when having recourse to the expedient of making the dusty intermediate product into compacted bodies before further treatment. As a consequence thereof, there will not be recovered metal answering as to purity the practical requirements.

It is among the objects of this invention to provide a method for separating volatile matter from non-volatile concomitants by sublimation, while attaining commercially economical rates of vapor flow and yet producing a solid deposit practically free from solids carried over by the vapor.

A further object is to enable magnesium vapor disengaged at a commercial rate from impure starting material, to be directly condensed as a solid deposit practically free from solid impurities.

A special object is to provide a simple and commercially practicable method for recovering pure magnesium metal from the dusty condensate that is formed in the course of the carbothermic reduction of magnesium oxide by the rapid cooling of the vapor and gases at the point of their leaving the furnace in which the reduction takes place.

Other objects will appear from the following description.

Figure 2:
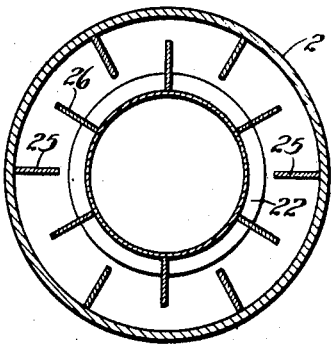
Figure 3:
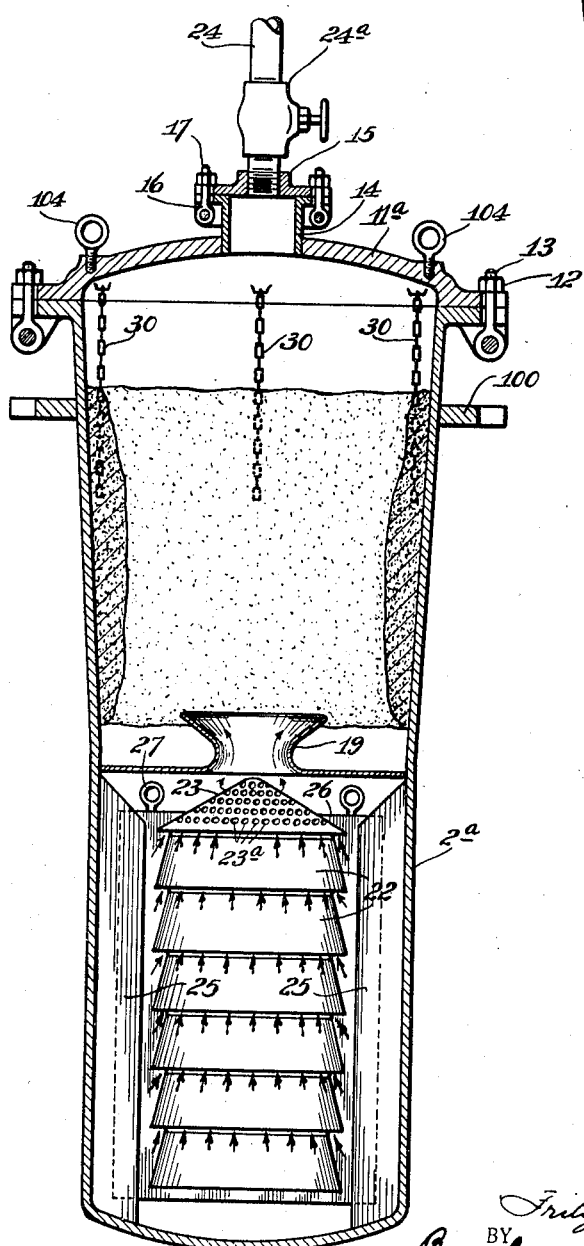

The invention may be described as applied to the refining of magnesium dust of the type referred to and with reference to the accompanying drawings in which Fig. 1 is a vertical section through the preferred embodiment of an apparatus in accordance with the invention; and Fig. 2 a horizontal section illustrating constructional details and taken on the line II—II, Fig. 1, and Fig. 3 a vertical section through a modified form of an apparatus in accordance with the invention.

The process according to the invention essentially consists in treating the said starting product under temperature and pressure conditions such as to make sublime the magnesium contained therein at a rate sufficiently rapid to be commercial, and restricting the speed of travel of the vapor evolved on its way to the condenser to a rate capable of promoting deposition of suspended solids owing to their natural gravity. In other words, I have discovered that by retarding the speed of flow of the vapor from the sublimation zone to the condenser when operating under pressure conditions enabling the magnesium to be sublimed, individual control of the speed of flow of the vapor from the sublimation zone to the condenser renders it possible to so adjust the rate of heat supply to the starting material that rapid sublimation takes place, and yet to condense the metal in the state of highest purity.

The apparatus particularly suited to the practice of the method which is shown in Figs. 1 and 2 comprises an outer pressure-tight metallic shell 1 within which there is disposed a pressure-tight cylindrical metallic container 2 the lower portion R of which acts as a retort chamber and the upper portion C of which provides a condensing chamber. To conserve heat, shell 1 is provided with insulation, suitably a lining 3 constructed from insulating brick, the inner face of lining 3 being spaced from container 2 in such manner as to provide an annular space 4 between the container and the lining. Means are provided within space 4 for supplying heat to a charge of material disposed within the retort R. In the embodiment shown, this is accomplished by a coiled electrical resistor 5 connected by wires 6 and 6a to a source of electric current, not shown, whereby heat for sublimation is supplied by radiation to the retort portion of container 2. Pyrometers 7 may be arranged at suitable points for measuring and controlling the temperature.

Continer 2 is provided with a suitable cover 11 which may be secured in pressure-tight manner by any suitable means such as nuts 12 cooperating with bolts 13. Adjacent its top the container 2 is provided with an outwardly extending flange 100 welded or otherwise connected to the container so that the joint therebetween is pressure-tight. For handling the container hooks 104 may be connected to cover 11. When the container is inserted into the apparatus the flange 100 engages a flange 101 similarly connected to the upper end of shell 1, as shown in Fig. 1. This serves to suspend the container properly in the space 4 at the inside of shell 1 with refractory lining 3. Also, swing bolts 102 carried by flange 101, and nuts 103 are provided for clamping flanges 100 and 101 together so that container 2 may be evacuated.

Disposed within the condensing chamber C of container 2 is a removable metallic liner member 8 which is supported, for example, by angles 9 fastened to the container wall to hold the liner in proper position within the condensing chamber. Desirably this mounting is such as to prevent entry of sublimed vapor between the liner and the container. Usually, it will be desirable to provide means of abstracting heat from the condensing chamber to facilitate or control the condensation of vapor on liner 8. In the embodiment shown this may be accomplished by circulating a cooling fluid, such as air, through a coil 10 of pipe surrounding the condensing chamber within the annular space 4.

The retort chamber R of the container 2 is provided with means for controlling the speed of the vapor passing from the retort to the condenser. The form shown consists of a series of open-bottom, imperforate walled co-axially superimposed hollow members 22 in the shape of truncated cones, which are so arranged as to leave a small space between each pair of the successive members, the lowermost of which is disposed near the bottom of container 2, the uppermost member 22 being surmounted by a conical cap 23 with slots 23a or other foramina.

For charging the apparatus, cover 11 is provided with an opening of appropriate size which may likewise be closed to maintain any desired vacuum within the container. As shown, the cover is provided with an opening having an extension 14 provided with a closure member 15 removably held in place by bolts 16 and nuts 17, this connection being likewise pressure-tight. Liner 8 carries a tubular charging shaft 18 so positioned as to receive material introduced through opening 14 and direct it downwardly into the retort chamber R, this being further assisted by a funnel-like member 19 carried by the bottom of liner 8. The liner may be of the split type for ease in removing and recovering the condensate, which will build up on the wall of the liner generally as indicated by the broken lines in Fig. 1. The liner may be provided with any suitable means for lifting it from and returning it to the container 2. In the embodiment shown this is accomplished by web members 20 connected to the upper end of the liner and provided with openings 21 for receiving lifting hooks. These webs serve also to support the charging shaft 18.

Increasing the rate of heat transfer to the interior of the charge may be accomplished by providing a series of spaced, radially positioned radiating plates or fins 25 connected to the container wall which preferably extend the full length of the retort. Moreover the members 22 may be rigidly connected with longitudinally running fins 26, for instance welded thereto, with the view of enabling the flow-regulating means to be easily lifted, as unitary structure, from the container by means of eyed hooks 27 or the like, and these plates or fins may also serve as radially extended radiating elements which are preferably disposed, as appears from Fig. 2, alternating with the plates or fins 25.

In the use of this apparatus for practicing the method provided by the invention, liner 8 is placed in the retort and cover 11 is connected in pressure-tight manner by nuts 12 and bolts 13. The assembly is then placed in the furnace and nuts 103 are screwed onto nuts 102 to make a pressure-tight connection between flanges 100 and 101. The charge of material to be treated is introduced into the apparatus after removing closure 15 by dumping the material into opening 14 whereby it will be discharged into the retort chamber. Closure 15 and cover 11 are then made pressure-tight, heat for causing sublimation is supplied by passing electric current to resistor 5, and container 2 is evacuated to the necessary extent. This may be done by connecting the container to a vacuum pump through a pipe 24, provided with a valve 24a, which passes through closure 15, or by effecting reaction between a portion of the magnesium and a gas reactive therewith such, for example, as air, nitrogen, carbon monoxide, chlorine, or the like, as disclosed and claimed in my copending application Ser. No. 355,087, filed August 31, 1940, which has matured into the Patent No. 2,240,817.

The container 1 is evacuated by a vacuum pump connected to a conduit 28 which opens into space 4 to produce the same vacuum as is produced within container 2. As a consequence, the walls of the latter will not be subjected to stresses caused by pressure differential, so that this container may be of lighter and less expensive construction than has been necessary heretofore.

The function of the flow-regulator shown and described is such that the vapor evolved has everywhere to pass only a thin layer of the charge which becomes heaped up around the centrally positioned series of members 22. The vapor which is rapidly disengaged from the charge enters with a high speed through the relatively small passageways between each individual pair of the successive members 22, thereby undergoing a preliminary purification by filtration, and is then allowed to expand into the large unobstructed channel formed by the set of co-axially superimposed members 22, and is consequently rising at a considerably lowered speed toward the condenser so that deposition of the suspended solids to their natural gravity is taking place and the purification of the vapor is thus completed in this way.

The maximum permissible speed of vapor travel will depend on the temperature and pressure conditions and consequently on the material to be sublimed, moreover, on the particular construction of the flow-regulator used. To illustrate the mutual relations of these different conditions, exact data may be given in regard to the refining of magnesium dust of the kind repeatedly referred to above. To obtain a condensate of the highest purity from this special material, the speed of vapor flow should not exceed about 4.5 meters per second. With a container 2 operated at 1 mm. absolute pressure, the charge being heated to a temperature of 750° C., and with heat supplied at a rate such as to vaporize 4 grams of magnesium per second, there will be formed and transferred to the condenser 11.2 litres of vapor per second. For the purpose of retarding the speed of vapor to approach 4.5 meters per second by a flow regulator as illustrated, a total open base area of members 22 amounting to 2.5 square meters has to be provided. This area would be supplied by ten members 22 arranged as shown and each having a base diameter of 900 mm. and a diameter of 700 mm. at its upper truncated end.

In the refining of magnesium dust of the type to which reference has been made, especially desirable results are obtained by making the dust into small compacted bodies. These facilitate the handling of the dust, and particularly, they greatly improve heat transfer through a charge as compared with an equal weight of dust in loose, unconsolidated form. Hence for most purposes I prefer to compact the dust into relatively dense tablets, or shapes, to prepare it for refining. If desired for any reason, a binder, preferably of inert and protective nature, may be used in compacting the dust.

It should be mentioned that the compacted dust, owing to its peculiar characteristics, will not melt down in spite of the charge being heated to 750° C., that is to say to a temperature considerably above the melting point of metallic magnesium. Though the term "sublimation" in its scientific connotation, is to be taken to mean the conversion of solid material to the vapor state at a temperature below its melting point (with condensation of the vapor evolved to the solid state without the intermediate formation of a liquid phase), the said term is used herein to include not only this exact scientific connotation but also the broader meaning of the professional technical language covering processes of the kind referred to above, in which the material under treatment is being kept at a temperature above its melting point and yet prevented by special expedients, from passing into the state of a true fluid melt.

Although the invention has been described as applied particularly to the refining of magnesium dust, it will be understood that the principle of the method is applicable to refining magnesium in other forms and to refining other sublimable materials of both metallic and non-metallic nature.

Various modifications of the apparatus and procedure shown and described are, of course, permissible. For instance, although liner 8 may be of a metal such as iron or steel, it may advantageously be made from the material being sublimed, e. g., in the case of magnesium a rolled sheet of pure magnesium. Such a liner with its deposit of condensed material may then be removed and used directly, thus avoiding the special construction needed for or difficulties that may be encountered in removing the deposit from a ferrous metal liner.

Another possibility is shown in Fig. 3. As shown, the upper or condensing end of container 2a is made of inverted conical form, and hooks 30 are suspended from cover 11a so that their lower hooked ends lie close to the wall, as shown. By providing the wall of the conical condensing chamber with a coating of graphite or other material which acts to prevent the adherence of condensed magnesium thereto, the body of condensed metal will embed the hooks 30 and may be lifted out as a unit upon removal of the cover 11a.

According to the provisions of the patent statutes, I have explained the principle and method of operation of my invention and have illustrated and described what I now consider to represent its best embodiment. However, I desire to have it understood that, within the scope of the appended claims, the invention may be practiced otherwise than as specifically illustrated and described.

The term "shock chilling" is used in the claims to include any kind of sudden cooling of the vaporous and gaseous products of reduction, whether this may be effected by mixing the said products with cooling gases or liquids or solids.

The term "compacted bodies," as used in the claims, is intended to include consolidated agglomerates of any kind whether the consolidation may be brought about by the action of pressure, such as by briquetting with or without the use of binding material, or by forming into grains or granules with the aid of fluids of fused solids which are decomposed and/or carbonized under the action of heat, and by subsequent baking.

I claim as my invention:

1. A method of extracting, in an intermittent operation, sublimable material from a starting product containing such material in conjunction with non-sublimable or less volatile concomitant body, which method comprises adjusting the absolute pressure in the system under operation low enough and the heat input high enough as to produce, in a heated zone, sublimation of the material to be extracted sufficiently rapid to be commercial, and causing the vapor evolved to escape through a vapor flow controlling means of a permanent nature being placed in the heated zone and capable of effecting separating out suspended solids from the vapor stream during its passage through said zone by reducing its velocity of flow; and then allowing the vapor to condense, in a condensation zone, directly to a solid deposit.

2. In the manufacture of a volatile metal from a material bearing the metal together with non-volatile or less volatile concomitants, the method which comprises forming said material into compacted bodies, introducing said bodies into a closed gas-tight container comprising a heating chamber, a condensing chamber and a centrally positioned flow-regulating device with a number of relatively small vapor passageways from outside toward the interior, whereas the interior as a whole forms a relatively large unobstructed hood flue opening into the condenser, the compacted bodies being heaped up around the outside of the said flow regulator, and heated under temperature and pressure conditions such as to cause the bodies to give off the volatile metal required at a commercial rate of flow without coalescing; and then reducing the speed of the vapor travel on a section of the way to the condensing chamber to such an extent that suspended solids are allowed to settle, and cooling the vapor thus purified to a temperature below the solidification point of the metal, to condense the vapor directly to the solid state.

3. In the manufacture of magnesium metal from magnesium bearing dust, the method which comprises consolidating said dust into compacted bodies, introducing said bodies into a closed gas-tight container comprising a heating chamber, a condensing chamber and a centrally positioned flow regulating device with a number of relatively small vapor passageways from the outside toward the interior, whereas the interior as a whole forms a relatively large unobstructed hood flue opening into the condenser, the compacted bodies being heaped up around the outside of the said flow-regulator, and heated under temperature and pressure conditions such as to cause the bodies to give off magnesium vapor at a commercial rate of flow without coalescing; and then reducing the speed of the vapor travel on a section of the way to the condensing chamber to such an extent that suspended solids are allowed to settle, and cooling the vapor thus purified to a temperature below the solidification point of the metal, to condense the vapor directly to the solid state.

FRITZ J. HANSGIRG.